United States Patent
Schrade et al.

[15] 3,660,207
[45] May 2, 1972

[54] APPARATUS FOR THE CONTINUOUS PRODUCTION OF LAMINATES

[72] Inventors: Jean Schrade, Zurich; Harald Severus, Winterthur; Walter Muller, Meilen, all of Switzerland

[73] Assignee: Swiss Aluminium Ltd., Chippis, Switzerland

[22] Filed: Sept. 4, 1970

[21] Appl. No.: 69,820

[30] Foreign Application Priority Data

Sept. 9, 1969 Switzerland ................ 13602/69

[52] U.S. Cl. .......................... 156/555, 156/582, 156/583, 100/93 RP, 100/161
[51] Int. Cl. ........................ B31f 5/00, B02c 11/08
[58] Field of Search ............... 156/555, 580, 582, 583; 100/158, 161, 93 RP

[56] References Cited

FOREIGN PATENTS OR APPLICATIONS 1,229,012  3/1960  France ........................ 100/93 RP Primary Examiner—Douglas J. Drummond
Attorney—Ernest F. Marmorek

[57] ABSTRACT

An apparatus for use in the continuous production of composite plates having a core layer of plastic and cover layers. There is used a plurality of first rollers for receiving and discharging the layers, having a space between them equal or larger than the thickness of the laminates prior to rolling and a series of second parallel successive rollers downstream of the first rollers and being at varying planes parallel to the direction of movement.

12 Claims, 1 Drawing Figure

PATENTED MAY 2 1972
3,660,207
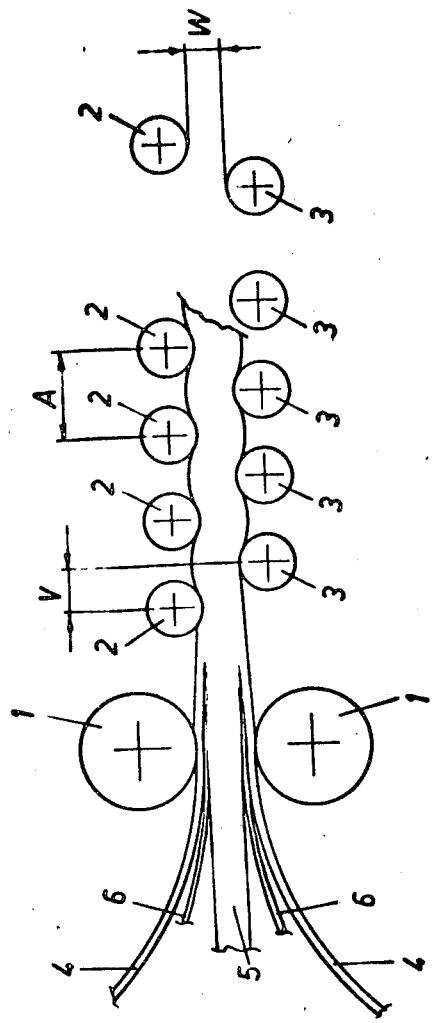
INVENTORS:
Jean Schrade,
BY Harald Severus
and Walter Müller,
THEIR ATTORNEY

3,660,207

APPARATUS FOR THE CONTINUOUS PRODUCTION OF LAMINATES

BACKGROUND OF THE INVENTION

The invention relates to an apparatus for the continuous production of composite plates having a plastic core, with the aid of rollers having a roller gap narrower than the total thickness of the plate before rolling.

Composite plates or laminates are flat materials (plates/sheets) symmetrically or asymmetrically composed of several layers of different materials. Many processes exist in the industry for the production of such laminates which are also called composite materials. The designation "lamination" is often used for this process.

Most of the known processes are concerned with the various layers being compressed together between two rollers and then generally secured together by an adhesive.

In order to produce the pressure required for compressing the layers together, the gap between the rollers should be slightly narrower than the total thickness of the layers to be compressed. In the known processes a pressure is applied which is substantially less than the compressive strength of the individual layers. In many cases this pressure is adequate to obtain a sufficient adhesion of the layers, for instance, in the production of composite foils for decorative and other uses where the composites are not subjected to any great mechanical strain.

For composite plates consisting of a covering layer (e. g. a metal sheet) and a layer of a thermoplastic material (polyethylene, polyvinylchloride etc.) such as are used as construction material, for example, for building and vehicle construction, the individual layers have to show a higher reciprocal adhesive strength. To obtain this adhesive strength, a higher pressure has to be applied when manufacturing them. When the pressure is high, however, the laminate discharged from the rollers is not plane but slightly corrugated. The softer thermoplastic core material is deformed between the rollers and a bulge is formed in front of the roller gap. Due to the push of the next oncoming material and the covering layers, the development of this bulge is limited, so that periodically it is more or less evenly pressed through the roller gap. It is therefore apparent that a plane product will only be obtained if the region of actual lamination forms a straight line over the width of the material. If, for example, there occurs an irregular passage of the bulge, the places on which the pressure disappears after leaving the gap will no longer lie on a straight line normal to the moving direction. This means that at the same time the region where a simultaneous even pressure is applied does not lie on a straight line normal to the direction of run. The result of the foregoing is the formation of corrugations.

The foregoing theoretical considerations arrived at by practical experience make it clear that an absolutely plane laminate composed of two covering layers and a soft core cannot be obtained with a single pair of rollers, if it is necessary also to apply a high pressure. The reasons are, as mentioned before, the necessity of obtaining a high adhesive strength of the layers and a sufficient friction between the covering layers and the rollers so that they will not slip upon each other.

SUMMARY OF THE INVENTION

One of the principal objects of the present invention is to provide for an apparatus for the continuous production of composite plates which is not subject to the drawbacks of the prior art.

It is another object of the present invention to provide an apparatus which is simple and positive in operation and requires very little maintenance.

It is still another object of the present invention to provide for an apparatus that is relatively inexpensive to make and operate.

Broadly speaking, the apparatus is comprised of a series of first rollers having a gap therebetween equal or larger than the thickness of the composite plate prior to rolling. They are able to receive and discharge in one direction said plates. The first rollers, in a preferred embodiment, have their axis of rotation aligned substantially within a plane perpendicular to the aforesaid one direction.

There is also a system of at least three parallel successive rollers which are arranged in at least two different heights and staggered in said one direction relative to each other, this set of rollers being disposed downstream of the first set of rollers.

The invention further refers to the use of the apparatus for the manufacture of composite plates composed of a plastic core and covering layer of a material harder than said core. This harder material may for example be a plastic reinforced by fiber glass or another reinforcing material, or a metal such as aluminum.

The plastic core may be made of a thermoplast or duroplast, the latter, however, at the time the laminates are made, is still meltable and is hardened only during production. An elastomer may also be used as well as a mixture of any of the foregoing.

The apparatus is especially suitable for the production of bands (strips) of composite material having a polyolefin core and covering layers of aluminum which are bonded together by a meltable adhesive.

Further objects and advantages of the invention will be set forth in part in the following specification and in part will be obvious therefrom without being specifically referred to, the same being realized and attained as pointed out in the claims hereof.

The invention accordingly comprises the several steps and the relation of one or more of such steps with respect to each of the others, as exemplified in the following detailed disclosure, and the scope of the application of which will be indicated in the claims.

BRIEF DESCRIPTION OF THE DRAWING

The invention will become more readily apparent from the following description and the accompanying drawing which shows a schematic side view of an apparatus for the continuous production of composite plates.

DETAILED DESCRIPTION

The accompanying drawing shows a schematic side view of an apparatus for the continuous production of composite plates.

In carrying the invention into effect there is provided an apparatus consisting of at least two first guide rollers 1 and a system of several second rollers 2 and 3 disposed along two rows, such as for example, upper and lower and being parallel to each other. The layers to be laminated are fed combinely into the first rollers 1. The present example concerns the production of a laminate composed of two cover layers 4 and a core 5 of thermoplastic synthetic material with an adhesive layer 6 between both the core 5 and each of the covering layers 4.

A gap between first rollers 1 is larger, or the same, as the total thickness of the layers to be laminated. The first rollers 1 may also be heated, thus serving to heat up the covering layers 4.

The upper second rollers 2 are arranged on a level surface, there being at least two of them. They may be arranged either above or below the product to be made. The lower second rollers 3 on the opposite side may be of the same number or one less than the upper second rollers 2. They can be moved up or down singly or in groups of several rollers, their height determining the roller gap W which, during production, is less than the total thickness of the layers to be laminated.

The distance between the second rollers 2 and 3 may be increased at the beginning of production, i.e. when the layers are first fed into the gap W. The size of the roller gap W may be different between successive upper second rollers 2.

Moreover, the lower second rollers 3 are staggered in relation to the upper second rollers 2 in the direction of the run, thus permitting the alternation V to be set as desired and also varied in respect to the successive second rollers 2 and 3.

The favorable distance A of the upper second rollers 2, of the roller gap W, between the single second rollers 2 and 3 and the most suitable alternation V for each of the lower second rollers 3 depends on the material properties of the composite plate and the process conditions, the foregoing need be ascertained by tests. When correctly set, the forming of bulges in the core layer 5 is avoided and a completely plane composite plate is obtained.

To set the temperature necessary for the production of composite plates, the second rollers 2 and 3 can be heated and/or cooled. It is advantageous to heat the second rollers 2 and 3 at the beginning of the run and to cool them at the end of the run.

EXAMPLE 1

In a layout according to the drawing with eight top second rollers 2, eight other second rollers 3 were arranged on the opposite side, whereby the numeration of the other second rollers 3 in the direction of run was as follows:

```
Rollers 3    1:V = 50mm    W = 2mm
             2:V = 50mm    W = 2mm
             3:V = 50mm    W = 2mm
             4:V = 50mm    W = 3mm
             5:V = 50mm    W = 3mm
             6:V = 50mm    W = 3.5mm
             7:V = 50mm    W = 4mm
             8:V = 50mm    W = 4mm
Diameter of rolls 80mm
```

A hard sheet of 4mm thickness PVC was used as the core layer 5 and an aluminum sheet which had been treated on one side with an adhesive was used to cover layer 4. With a speed of 1m/min this composition passed through the roller system and was discharged as a plane, tightly compressed laminate.

The temperature of the aluminum sheet when entering was 180° C, and that of the PVC core layer 40° C. When discharged, the temperature of the core layer was 65° C.

EXAMPLE 2

In a layout according to Example 1, plates of polyethylene of high density 1.3mm thick were used as a core layer 5. An aluminum sheet 0.5mm thick, embossed with a "Stucco" design was used as covering layer 4. Between the sheet 4 and the core layer 5 an adhesive foil, 0.1mm thick, made of ethylene acrylacid — copolymer was laid. The temperature of the sheets when entering was 200° C, that of the core layer 30° C. The discharged laminate was absolutely plane.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. An apparatus, for use in the continuous production of composite plates of a predetermined thickness including a core layer of plastic and cover layers, comprising in combination:

a plurality of first rollers receiving and discharging in one direction said layers and being spaced apart from each other for a certain distance and having their axes of rotation aligned substantially within a plane perpendicular to said one direction;

said certain distance between said first rollers being equal or larger than the thickness of said layers before rolling;

a plurality of second parallel successive rollers disposed in a plurality of rows, the second rollers of each row being staggered in said direction relative to the second rolls of any other row and located downstream of said first rollers, said rows being in planes substantially parallel to said one direction.

2. An apparatus, as claimed in claim 1, wherein said second rollers are comprised of at least three pairs of rollers.

3. An apparatus, as claimed in claim 1, wherein said second rollers are shiftable among various of said planes substantially parallel to said one direction.

4. An apparatus, as claimed in claim 1, wherein said two cover layers are made of a material harder than said core layer.

5. An apparatus, as claimed in claim 1, wherein at least two of said second rollers convey heat to said composite plates.

6. An apparatus, as claimed in claim 1, wherein at least two of said second rollers absorb heat from said composite plates.

7. An apparatus, as claimed in claim 4, wherein said cover layers are made of a reinforced plastic material.

8. An apparatus, as claimed in claim 4, wherein said cover layers are made of metal.

9. An apparatus, as claimed in claim 1, wherein said core layer is made of a thermoplastic material.

10. An apparatus, as claimed in claim 1, wherein said core layer is made of a plastic material which is being hardened during the run of said plate through said rollers.

11. An apparatus, as claimed in claim 1, wherein said core layer is made of an elastomeric material.

12. An apparatus, as claimed in claim 4, wherein said core layer is made of a polyolefin and said cover layers are made of aluminum, and an adhesive layer bonding said cover layers to said core.

* * * * *